(12) United States Patent
Barthlott

(10) Patent No.: US 6,660,363 B1
(45) Date of Patent: *Dec. 9, 2003

(54) SELF-CLEANING SURFACES OF OBJECTS AND PROCESS FOR PRODUCING SAME

(76) Inventor: Wilhelm Barthlott, Meckenheimer Allee 170, Bonn (DE), D-53115

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/776,313
(22) PCT Filed: Jul. 25, 1995
(86) PCT No.: PCT/EP95/02934
§ 371 (c)(1), (2), (4) Date: Jan. 22, 1997
(87) PCT Pub. No.: WO96/04123
PCT Pub. Date: Feb. 15, 1996

(30) Foreign Application Priority Data

Jul. 29, 1994 (DE) .......................... 44 26 962

(51) Int. Cl.[7] .............................. B29C 59/00; B32B 3/26
(52) U.S. Cl. .................. 428/141; 428/143; 428/913; 428/167; 428/171; 428/220; 428/332; 428/338; 264/284; 264/293; 427/180
(58) Field of Search ................. 428/141, 143, 428/913, 167, 171, 220, 332, 338; 264/284, 293; 427/180

(56) References Cited

U.S. PATENT DOCUMENTS

| | | | |
|---|---|---|---|
| 3,354,022 A | 11/1967 | Dettre et al. ................. | 161/123 |
| 5,324,566 A * | 6/1994 | Ogawa et al. .............. | 428/141 |
| 2002/0048679 A1 * | 4/2002 | Lohmer et al. ............. | 428/447 |

FOREIGN PATENT DOCUMENTS

| | | |
|---|---|---|
| JP | 62 191 447 | 8/1987 |
| WO | 89 00592 | 1/1989 |

OTHER PUBLICATIONS

*Database WPI*, Section Ch, Week 8739, Derwent Publications Ltd., London, GB; Class A82, AN 87–274411.

* cited by examiner

*Primary Examiner*—William P. Watkins, III
(74) *Attorney, Agent, or Firm*—Jacobson Holman PLLC

(57) ABSTRACT

The self-cleaning surfaces of objects have an artificial surface structure of elevations and depressions wherein the distances between said elevations are in the range of from 5 to 200 $\mu$m, and the heights of said elevations are in the range of from 5 to 100 $\mu$m, and at least said elevations consist of hydrophobic polymers or permanently hydrophobized materials, and said elevations cannot be detached by water or by water containing detergents.

10 Claims, No Drawings

SELF-CLEANING SURFACES OF OBJECTS AND PROCESS FOR PRODUCING SAME

The present invention pertains to self-cleaning surfaces of objects and a process for producing same wherein the self-cleaning is preferably effected by the surfaces being exposed from time to time to rain or moving water.

The cleaning of the surfaces of objects is of considerable technical and economical importance, partly for optical and aesthetical reasons, partly for technical reasons, particularly in the case of transparent surfaces which must be cleaned from time to time for preserving their function.

There was no lack of attempts to provide technical surfaces which are dirt-repellent and/or self-cleaning with the aid of rain or moving water. The success of these efforts has been relatively small, however, since the properties of such surfaces are maintained only for a relatively short period of time. Thus, the manufacturers of polymer sheets or polymer boards have tried to solve this problem by producing surfaces which are as smooth as possible and turning these surfaces either extremely hydrophobic or extremely hydrophilic. Examples thereof include surfaces made of extremely hydrophobic Teflon, or the extremely hydrophilic "no-drop coatings" from which water and dirt can flow off without forming drops.

CH-PS-26 82 58 describes water-repellent surfaces which exhibit a contact angle with water of more than 120°. They are obtained by applying powders, such as china clay, talc, clay or silica gel, on a substrate, the powder being first hydrophobized by organic silicon compounds. The application is performed together with curable resins or from solutions in organic solvents. Permanently hydrophobic surfaces cannot be produced in this way. Also, there are no indications as to the grain sizes or grain size distributions of the powders. The properties of the surfaces thus obtained are compared with those of the leaves of nasturtium. With this comparison, it should be noted that it was neither known nor technically analyzable whereon the properties of the leaf surface of nasturtium are based. Studies recently performed have shown that nasturtium has an extremely fine ultrastructure with structural elements smaller than 2 $\mu$m. Such surface structures can hardly be generated artificially, and moreover are extremely sensitive mechanically. Thus, nasturtium is a very unsuitable model. Therefore, such structures are not the subject matter of the present invention.

DE-PS-10 23 217 describes a mold for the preparation of molded parts having rough surfaces. The mold is to serve for the preparation of molded parts made of rubber or plastic and having rough surfaces. To achieve this, the walls of the mold are coated with coarse corundum powder and a stoving paint. The molds yield products having occasional depressions and therefore improved adhesive properties. The usual vulcanization skin is even omitted. The surfaces thus obtained are well inscribable, for example. Thus, the products are surely not self-cleaning with moving water.

JP-A-3-174279 (abstract) describes a process for the preparation of matt, decorative surfaces on paper or plastic sheets. They are prepared with paints which are preliminarily cured by means of ionizing radiation and in which unspecified patterns are stamped in an unspecified way. Then, they are completely cured by further irradiation.

Many years' studies by the Applicant have shown that the surfaces of certain plants are capable of cleaning themselves by rain or moving water and that also no solid dirt particles can be permanently deposited on such surfaces. These dirt-repellent properties have for a long time been assigned to various wax layers on the plant surface.

However, more detailed examinations have meanwhile shown that the capability of self-cleaning of the plant surfaces is not so much dependent on the kind of wax, but on the surface structure of such waxes. Further examinations have shown that the capability of self-cleaning can in many cases be destroyed by the use of detergents in the water since this leads to an alteration of the wax particles.

The further detailed examinations of the Applicant have now yielded the surprising result that it is technically possible to artificially render the surfaces of objects self-cleaning by artificially providing them with a surface structure of elevations and depressions, taking care that the distances between the elevations of the surface structure are in the range of from 5 to 200 $\mu$m, preferably from 10 to 100 $\mu$m, and the heights of the elevations are in the range of from 5 to 100 $\mu$m, preferably from 10 to 50 $\mu$m, and taking care that these elevations consist of hydrophobic polymers or permanently hydrophobized materials, and taking care that the elevations cannot be detached by water or by water containing detergents.

Such self-cleaning surfaces can be prepared either by creating the surface structures already in the preparation from hydrophobic polymers, or by creating them subsequently, either by subsequent stamping or etching, or by glueing thereon a powder of the hydrophobic polymers. Finally, it is possible to create such self-cleaning surfaces of objects by subsequent permanent hydrophobizing of preliminarily prepared surfaces having the desired structures. One possibility for the subsequent permanent hydrophobization is subsequent silanization of preliminarily prepared surfaces having the desired structures. Silanization can be performed on all materials which are per se hydrophilic, but which are capable of reacting with the reactive groups of silanes so that the surface ultimately consists of the hydrophobic residues of the silanes.

Of particular technical importance are self-cleaning surfaces of objects which are transparent and which are to retain this transparency for a long time for optical, aesthetical or technical reasons. In particular, these are transparent glassworks of buildings, vehicles, sun collectors etc. Also of economical and technical importance, however, is the preparation of self-cleaning surfaces of house facades, roofs, monuments and tents, and of inner linings of silos, tanks or pipelines which either contain aqueous solutions or can readily be cleaned by moving water without leaving any residues. Also of interest are the outer coatings of vehicles, such as cars, trains or airplanes. It is to be taken care then, however, that these surfaces, when cleaned with moving water, must not be exposed to high mechanical strains since this would result in a leveling or polishing of the surface structures so that they become shining, but lose their capability of self-cleaning.

In order to create the desired surface structures in the preparation from hydrophobic polymers already, the objects can from the start be prepared in molds which have the negative of the desired surface structure. Further, it is possible to apply the hydrophobic polymers in the form of solutions and/or dispersions which result in the desired surface structures when drying and curing. Such structures are generated, for instance, from self-organizing polymers, or under conditions as are per se known from the preparation of matt finish paint surfaces.

If it is not possible or not desired to create the desired surface structures from the beginning, this can also be done later, for example, by subsequent stamping or etching. Stamping can be performed, for instance, by heated or heatable forming punches. Etching can be performed with the known means of chemical etching, or by physical methods, such as ion etching with oxygen or other bombardments which lead to a roughening of the surface and thus to a suitable surface structure according to the invention.

Further, it has been shown that it is also possible to obtain the desired surface structure by glueing a powder of the hydrophobic polymers. Powders of hydrophobic polymers having the desired grain sizes are available. Optimum results are only achieved, however, if powders are employed having a relatively narrow grain size distribution.

It could not have been foreseen that the surface structures according to the invention having elevations and depressions consisting of hydrophobic polymers or corresponding subsequently permanently hydrophobized surface structures are capable of being cleaned by rain or moving water without leaving any residues. In particular, it had to be expected that solid particles which are smaller than the distances between the elevations would lead to an occupation of the interspaces and thus reduce the desired self-cleaning properties. It has been found, however, that the self-cleaning effect will function perfectly, even if there is contamination with particles so extremely fine that they become nested in the interspaces between the surface sculptures: impinging water drops (e.g., rain) are briefly pressed between the microsculptures in the very moment of impinging due to their kinetic energy, and dirt which is sticking there is torn away and subsequently washed off together with the rolling drop.

Further, it has been shown that the self-cleaning surfaces according to the invention may positively even come into contact with water containing detergents. The self-cleaning property of the surfaces is first lost, but will be regained as soon as the detergents are removed again by subsequent raining or washing with pure water. Thus, in contrast to the self-cleaning plant surfaces, the detergents cannot cause permanent damage. Thus, the self-cleaning property of the surfaces can only be destroyed by mechanical destruction of the surface structures. According to the invention, it is possible even then, however, to restore the self-cleaning effect at least to a certain extent by glueing a suitable powder of hydrophobic polymers. Evidently, the water-repellency is based on the fact that water drops rest only on the tops of the elevations and thus have only an extremely small contact area with the surface. However, relatively much air is trapped between the water drops and the surface of the depressions so that the interface appears silvery. Since air is a very hydrophobic material, the drop adopts the smallest possible surface, i.e. it becomes a sphere and thus rolls off the surface upon the least vibration. In a similar way, the adhesion of solid particles to the surface is also reduced. Irrespective of their chemical nature, they exhibit a more or less high affinity to water drops so that they are removed from the surface together with drops rolling off.

Optimum results are achieved when the elevations of the surface structures are sufficiently close to one another to avoid a contact of water drops with the depressions lying between the elevations. If the elevations of the surface structures are too close to one another or the depressions are not deep enough, they again act as a closed surface and thus can be more readily wetted. Therefore, it should be sought that with increasing distance of the elevations, the heights of the elevations above the ground should also increase. The measurements performed to date have shown that within the claimed limits of the distances and heights of the elevations, good results are achieved. Optimum results are yielded by surfaces having elevations of from 10 to 50 $\mu$m in height wherein the distance between the elevations is from 10 to 100 $\mu$m. At any rate, such surface structures can be used wherever a self-cleaning by moving water, such as rain, is desired without detergents.

In the following examples, preferred embodiments on a laboratory scale are described. However, methods similar in principle can be used on a large, industrial scale, including those which have already been used for other purposes and with other dimensions for altering and designing surfaces without generating the surfaces according to the invention having self-cleaning properties.

EXAMPLE 1

A smooth surface made of a plastic material, such as Resopal or polyethylene, is uniformly coated with a thin layer of a glue, such as UHU PLUS®, and subsequently coated with a Teflon powder, such as Hostaflon® TF 9205 (average particle size 7 $\mu$m). After curing, a surface is formed from which deposited particles, such as carbon black and powdered pigment, can be washed with water.

EXAMPLE 2

A smooth hydrophobic material, such as PTFE, is heated until it becomes plastic in character. Then, a high mesh screen from offset printing is pressed onto the surface and removed again. After cooling, a surface has formed having regularly arranged elevations and depressions of comparable heights. By using different screens having different mesh widths and thicknesses, the dimensions can be changed and optimally adjusted. The properties of the surfaces thus obtained are optimum when the elevations have rounded tops of course, such surface structures can also be prepared by means of heated punches or rolls. Corresponding sheets can be adhered to another, smooth substrate.

What is claimed is:

1. An object having an exposed surface, said exposed surface consisting essentially of elevations and depressions, wherein distances between elevations are in the range 5–200 $\mu$m, heights of said elevations are in the range 5–100 $\mu$m, said elevations are made of hydrophobic polymers or permanently hydrophobized materials, said elevations cannot be detached from said object by water or water containing detergents, and said exposed surface is self-cleaning upon exposure to rain or running water, alone, in that drops of water on the surface become substantially a sphere and solid particles on the surface are removed from the surface together with the drops of water rolling off the surface.

2. The object of claim 1, wherein distances between elevations are in the range 10–100 $\mu$m, and heights of said elevations are in the range 10–50 $\mu$m.

3. The object of claim 1, wherein distances between elevations are in the range 10–100 $\mu$m.

4. The object of claim 1, wherein heights of said elevations are in the range 10–50 $\mu$m.

5. The object of claim 1, wherein said exposed surface is transparent.

6. A method of affecting surface properties of an object comprising the step of forming on said object an exposed surface consisting essentially of elevations and depressions such that distances between elevations are in the range 5–200 µm, heights of said elevations are in the range 5–100 µm, said elevations are made of hydrophobic polymers or permanently hydrophobized materials, said elevations cannot be detached from said object by water or water containing detergents, whereby, said exposed surface is self-cleaning upon exposure to rain or running water, alone, in that drops of water on the surface become substantially a sphere and solid particles on the surface are removed from the surface together with the drops of water rolling off the surface.

7. The method of claim 6, wherein distances between elevations are in the range 10–100 µm, and heights of said elevations are in the range 10–50 µm.

8. The method of claim 6, wherein distances between elevations are in the range 10–100 µm.

9. The method of claim 6, wherein heights of said elevations are in the range 10–50 µm.

10. The method of claim 6, wherein said exposed surface is transparent.

* * * * *